United States Patent
Nakajima

[11] Patent Number: 5,940,127
[45] Date of Patent: Aug. 17, 1999

[54] IMAGER INCLUDING A SOLID STATE IMAGING DEVICE WITH OPTICAL LOW PASS FILTER

[75] Inventor: Ken Nakajima, Tokyo, Japan

[73] Assignee: Sony Corporation, Tokyo, Japan

[21] Appl. No.: 08/705,222

[22] Filed: Aug. 29, 1996

[30] Foreign Application Priority Data

Aug. 31, 1995 [JP] Japan ..................................... 7-224073

[51] Int. Cl.⁶ ............................ H04N 5/225; H04N 9/64; H04N 5/335
[52] U.S. Cl. .......................... 348/342; 348/250; 348/317; 359/498
[58] Field of Search ..................................... 359/494, 495, 359/497, 498; 348/335, 340, 342, 344, 343, 250, 317, 319, 320, 321, 322, 323; H04N 5/225, 9/64, 5/335

[56] References Cited

U.S. PATENT DOCUMENTS

| | | | |
|---|---|---|---|
| 4,539,584 | 9/1985 | Otake | 358/44 |
| 4,761,682 | 8/1988 | Asaida | 358/50 |
| 5,452,129 | 9/1995 | Shiraishi | 359/497 |
| 5,471,343 | 11/1995 | Takasugi | 359/494 |
| 5,477,381 | 12/1995 | Sasaki et al. | 359/497 |

FOREIGN PATENT DOCUMENTS

| | | | |
|---|---|---|---|
| 59-66229 | 5/1984 | Japan | G02B 27/46 |
| 60-164719 | 8/1985 | Japan | G02B 27/46 |

*Primary Examiner*—Wendy Garber
*Assistant Examiner*—Ngoc-Yen Vu
*Attorney, Agent, or Firm*—Frommer Lawrence & Haug LLP.; William S. Frommer

[57] ABSTRACT

An imager with which it is possible to reduce the aliasing noise effectively. An imaging light from an object is condensed by an optical system 1 so as to fall on an optical low-pass filter 2. The optical low-pass filter 2 has trap points corresponding to zero values of the MTF characteristics on two points of ½ and 1 of the spatial sampling frequency on horizontal and vertical MTF characteristics, and reduces components less than one-half the spatial sampling frequency as determined by the arraying of the light receiving elements of a CCD 4 of the imaging light. The CCD 4 receives the imaging light, the spatial frequency of which has been suppressed by the spatial low-pass filter 2, and outputs an imaging light.

2 Claims, 11 Drawing Sheets

TRAP POINT

MTF IN VERTICAL DIRECTION

TRAP POINT

FIG.3 B

MTF IN HORIZONTAL DIRECTION

FIG.3 C

MTF IN VERTICAL DIRECTION

TRAP POINT

FIG.11B

MTF IN HORIZONTAL DIRECTION

FIG.11C

MTF IN VERTICAL DIRECTION

IMAGER INCLUDING A SOLID STATE IMAGING DEVICE WITH OPTICAL LOW PASS FILTER

BACKGROUND OF THE INVENTION

1. Field of the Invention

This invention relates to an imager suitably provided on e.g., a video camera for reducing the aliasing noise contained in an image pickup output from a solid-state imaging device.

2. Description of the Related Art

There has hitherto bee known an imager employing a solid-state imaging device such as a charge-coupled device (CCD). Such solid-state imaging device has a number of light receiving elements of small sized areas arranged in a lattice pattern on a light receiving surface of a semiconductor substrate. An imaging optical system reads out imaging charges generated by an incident light spot formed on the light receiving surface at a pre-set time interval and outputs the imaging charges as an imaging output at a pre-set time interval.

Figure 1:
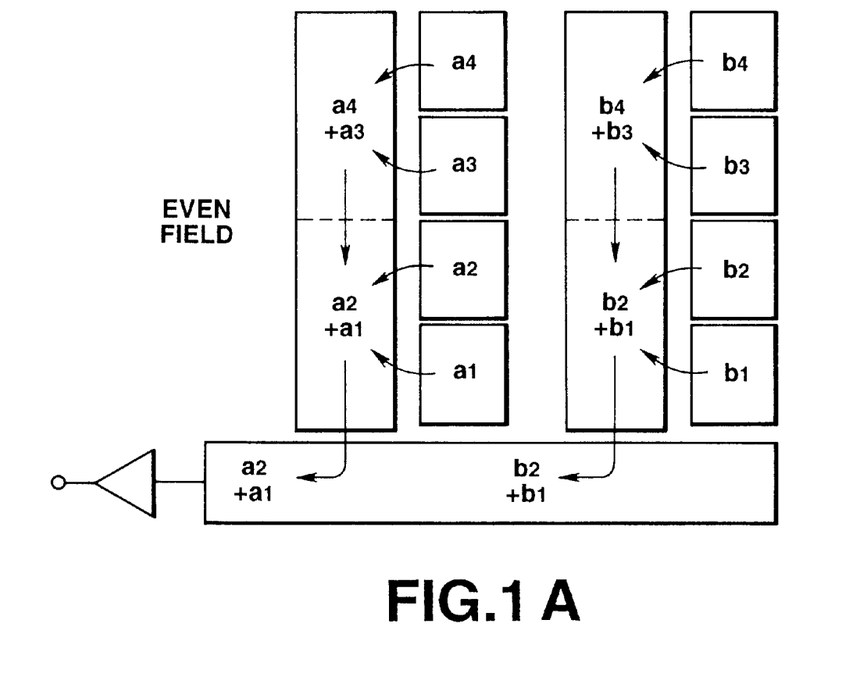
FIGS. 1A and 1B illustrate the read-out operation of reading out imaging charges from a solid-state imaging device constituting a conventional imager.

The solid-state imaging device, employed in such imager, has a number of light receiving devices, arrayed in a lattice pattern at a pre-set interval, and vertical and horizontal transfer lines for transferring imaging charges by the imaging light received by the light receiving elements, as shown in FIG. 1A. On the surface of each light receiving element, there is arrayed a color filter for limiting the wavelength of the imaging light incident on the light receiving elements.

Such solid-state imaging device is configured for alternately reading out the sum of charges of a reference light-receiving element and a light receiving element disposed directly above the reference element and the sum of charges of the reference light-receiving element and a light receiving element disposed directly below the reference element by way of so-called field readout. Specifically, for an even field, the sum of charges of a pixel above the reference pixel and the charges of the reference pixel is read out to a vertical transfer line, as shown in FIG. 1A. For an odd field, the sum of charges of a pixel below the reference pixel and the charges of the reference pixel is read out to a vertical transfer line, as shown in FIG. 1B. A one-frame picture is composed by an imaging output of consecutive odd and even fields.

By such field readout, the field frequency can be twice the frame frequency for improving the dynamic resolution of an imaging output.

However, with such solid-state imaging device, since the imaging light is sampled by a horizontal spatial sampling frequency fH and a vertical spatial sampling frequency fV, as determined by the array of the light receiving elements, in order to provide an imaging output, the frequency components higher than the spatial sampling frequency of the imaging light are aliased to a frequency area lower than the spatial sampling frequency, thus producing an aliasing noise superimposed on the imaging output.

Of the aliasing noise, the vertical frequency component can be reduced to a certain extent by the above field readout. However, the horizontal frequency component is left as it is.

Therefore, in the conventional imager, a light beam of the imaging light is separated into plural spots by plural double refraction plates, such as quartz plates, while an optical low-pass filter having a trap point corresponding to the zero imaging light intensity in the spatial frequency distribution of the imaging light is used for diminishing the spatial frequency components not less than one-half the spatial sampling frequency for reducing the aliasing noise.

Such low-pass filter has two to four double refraction plates of, for example, quartz plates, layered together and arranged so that the optical axes thereof are disposed at an angle of 45° with respect to the horizontal direction of the light receiving elements of the solid-state imaging device.

Figure 2:
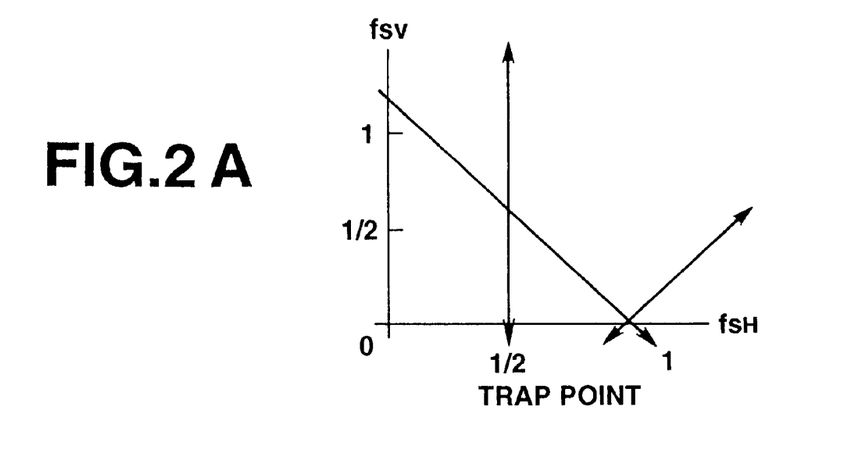
FIGS. 2A, 2B and 2C are graphs showing characteristics of an optical low-pass filter employed in the conventional imager.

Such optical low-pass filter has in its spatial frequency spectrum two trap lines having positive and negative gradients and intersecting the frequency axis fSH at a frequency position (fSH=1, fSV=0) and another trap line intersecting the frequency axis fSH at a frequency position (fSH=½, fSV=0) and extending parallel to the frequency axis fSV, as shown in FIG. 2A.

Therefore, the optical filter has trap points on a horizontal modulation transfer function (MTF) characteristic curve at two points on the horizontal MTF curve corresponding to fSH=½ and 1, as shown in FIG. 2B, while having a trap point on the vertical MTF curve at a point corresponding to fSV slightly larger than 1, as shown in FIG. 2C.

Figure 3A:
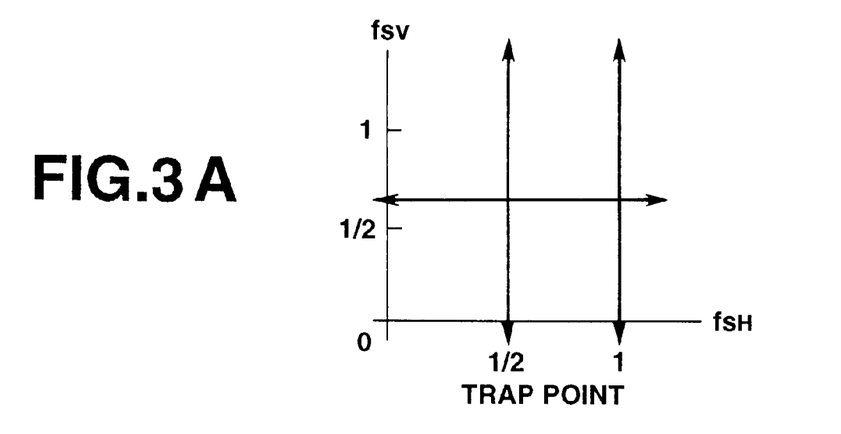
FIGS. 3A, 3B and 3C are graphs showing characteristics of another optical low-pass filter employed in the conventional imager.

Another known optical low-pass filter has in its spatial frequency spectrum two trap lines intersecting the frequency axis fSH at frequency positions (fSH=½, fSV=0) and (fSH=1, fSV=0) and extending parallel to the frequency axis fSH, while having a trap line intersecting the frequency axis fSV at frequency positions (fSH=0, fSV=½+δ) and extending parallel to the frequency axis fSH, as shown in FIG. 3A.

Figure 3B:
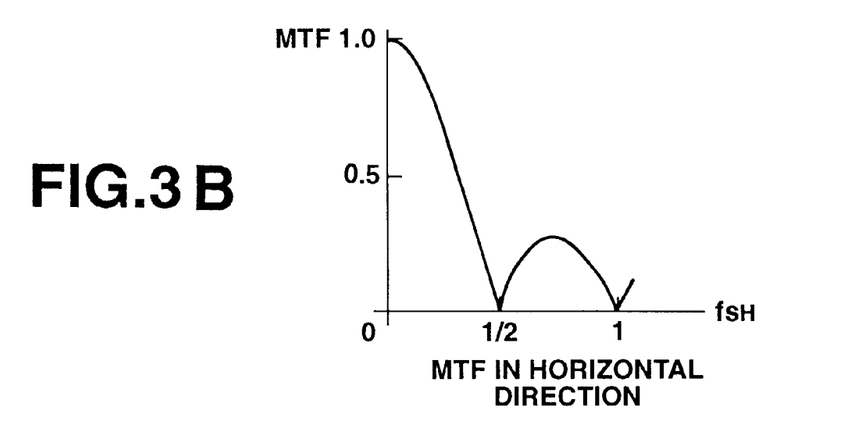
Figure 3C:
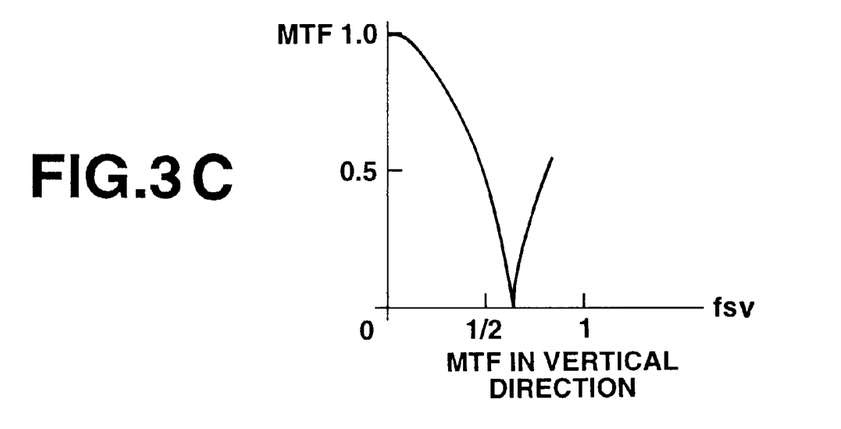

The optical filter has trap points on a horizontal modulation transfer function (MTF) characteristic curve at two points on the horizontal MTF curve corresponding to fSH=½ and 1, as shown in FIG. 3B, while having a trap point on the vertical MTF curve at a point corresponding to fSV slightly larger than ½, as shown in FIG. 3C.

By limiting the spatial frequency components of the imaging light incident on the light receiving elements using the above optical low-pass filter, it becomes possible to reduce the aliasing noise in the CCD imaging output.

For coping with a still picture in a digital still camera, frame readout, capable of accurately grasping an instant, is appropriate. The reason is that, even if the readout time is twice that for field readout, it is required with frame readout to seize a picture of higher resolution. For frame readout, electrical charges of all light receiving elements are read out on the vertical transfer line from frame to frame. However, if the optical low-pass filter as described above is used, suppression of the vertical components of the aliasing noise cannot be achieved, in distinction from the case of using the optical low-pass filter.

Therefore, two trap points are desirably provided on the MTF characteristics in the vertical direction as in the horizontal direction.

If the CCD is designed to cope with a camcorder, imaging charges imaged by light receiving elements are read out from the light receiving elements at a frequency equal to an integer number times the sub-carrier frequency of the NTSC signals of 3.58 MHz. Since the display period of a horizontal line (1H) remains fixed, the number of the light receiving elements in the horizontal direction is determined by the readout frequency. The number of the light receiving elements in the vertical direction corresponds to the number of the scanning lines. Since the interval between the light receiving elements is generally determined by the shape of a display screen and the number of the light receiving elements, the light receiving elements are arrayed in a rectangular pattern, with the spatial sampling frequency in the longitudinal direction differing from that in the transverse direction. If the above-mentioned trap points are provided in association with the spatial sampling frequencies differing in the longitudinal and transverse directions, the optical low-pass filter tends to be complex in structure.

SUMMARY OF THE INVENTION

It is therefore an object of the present invention to provide an imager whereby the aliasing noise otherwise superimposed on an imaging output from the imaging device may be reduced.

The present invention provides an imager employing a solid-state imaging device provided with light receiving elements arrayed in a square lattice configuration, and an optical low-pass filter for suppressing the band of the spatial frequency of the imaging light incident on the solid-state imaging device to not more than one-half of the spatial sampling frequency as determined by the arraying interval of the light receiving elements. The imaging light transmitted through the low-pass filter is received by the solid-state imaging device for reducing the aliasing noise superimposed on the imaging output even during frame readout.

DESCRIPTION OF THE PREFERRED EMBODIMENTS

Figure 4:
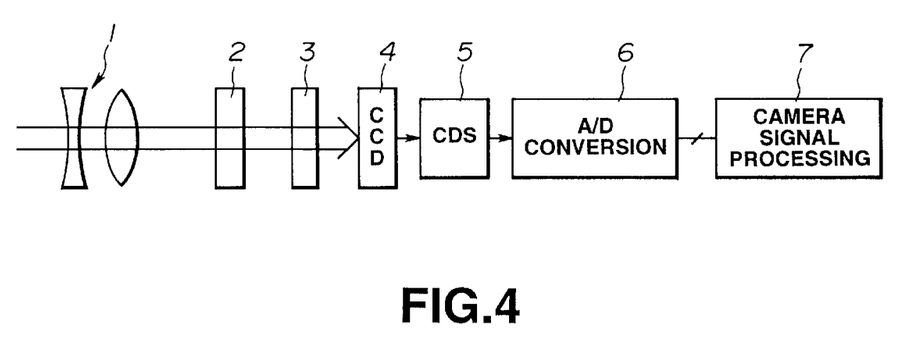
FIG. 4 is a block diagram showing an arrangement of a video camera device according to the present invention.

A video camera device employing an imager according to the present invention is now explained. FIG. 4 shows a structure of a video camera device employing an imager according to the present invention.

This video camera device has an optical system 1 for condensing the imaging light from an object, an optical low-pass filter (OLPF) 2 for limiting the spatial frequency of an imaging light condensed by the optical system, an infrared cut-off filter 3 for cutting off the infrared light and a charge coupled device (CCD) 4 as a solid-state imaging device.

The video camera device also includes a correlated differential sampling (CDS) circuit 5 for performing correlated differential sampling on stored charges in the light receiving elements read out from the CCD 4, an A/D converter 6 for analog/digital conversion of the output of the CDS circuit 5 and a video signal processor 7 for processing a output of the A/D converter 6 and outputting the processed output.

Figure 5:
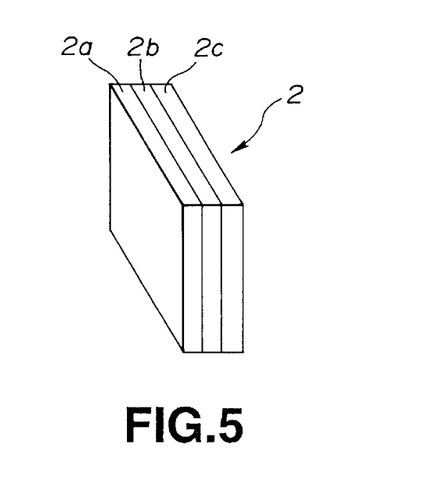
FIG. 5 is a perspective view showing an arrangement of an optical low-pass filter constituting the video camera device.

The optical low-pass filter 2 is made up of a first double refraction plate 2a, a second double refraction plate 2b and a third double refraction plate 2c, all formed by quartz plates, as shown in FIG. 5.

Each double refraction plate separates the incident light into an ordinary light beam and an extraordinary light beam. The separation characteristics depend upon the refractive index $n_o$ of the ordinary light beam, refractive index $n_e$ of the extraordinary light beam and an angle e the optical axis of the double refraction plates makes with the incident light. If an angle an output of the ordinary light beam makes with an output of the extraordinary light beam is $\phi$, the following equation (1) holds:

$$\tan \phi = \{(n_e^2 * n_o^2 \sin \theta \cos \theta)/(n_e^2 \cos^2\theta + n_o^2 + n_e^2 \sin^2\theta) \quad (1)$$

For enlarging the separation angle with a thin double refraction plate with high efficiency, the angle $\theta$ the optical axis of the double refraction plate makes with the incident angle is set to 45°. In this case, the angle $\phi$ between the ordinary light beam and the extraordinary light beam is given by:

$$\tan \phi = n_e^2 * n_o^2 / n_e^2 + n_o^2 \quad (2)$$

If the thickness of the double refraction plates is denoted as d, a separation distance L between the ordinary light beam and the extraordinary light beam is represented by the equation (3):

$$L = d \tan \phi \quad (3)$$

Figure 6:
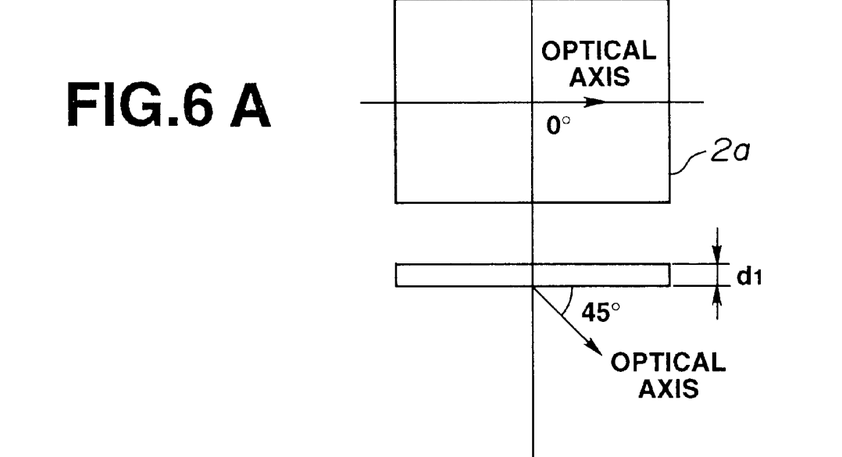
FIGS. 6A, 6B and 6C illustrate an arrangement of a double refraction plate constituting the low-pass filter.

With the above low-pass filter, the double refraction plates, having the above-mentioned characteristics, are arrayed as shown in FIGS. 6A to 6C. The first double refraction plate 2a has a thickness d1 and is arrayed so that its optical axis is horizontal with respect to the horizontal array of the light receiving elements of the CCD 4 and is at an angle of 45° with respect to the light receiving surface of the CCD 4, as shown in FIG. 6A. The second double refraction plate 2b has a thickness d2 and is arrayed so that its optical axis is 45° with respect to the horizontal array of the light receiving elements of the CCD 4 and is at an angle of 45° with respect to the light receiving surface of the CCD 4, as shown in FIG. 6B. The third double refraction plate 2c has a thickness d3 and is arrayed so that its optical axis is perpendicular to the horizontal array of the light receiving elements of the CCD 4 and is at an angle of 45° with respect to the light receiving surface of the CCD 4, as shown in FIG. 6C.

The first and third double refraction plates 2a, 2c are of an equal thickness, while the thickness of the second double refraction plate d2 is one-half the root of the thickness d1 of the first double refraction plate 2a. Specifically, with the lattice spacing of the light receiving elements of the CCD 4 of a "m, the thicknesses d1, d3 of the first and third double refraction plates 2a, 2c are set to 0.1685 a "m, while the thickness d2 of the second double refraction plate 2b is set to 0.1192 a "m, if the first and the third double refraction plates 2a, 2c are formed of quartz. The thicknesses d1 to d3 of these double refraction plates 2a to 2c are varied with the refractive index of the material of the double refraction plates and the angle the optical axis of the double refraction plates makes with the light receiving surfaces of the CCD 4.

Figure 7:
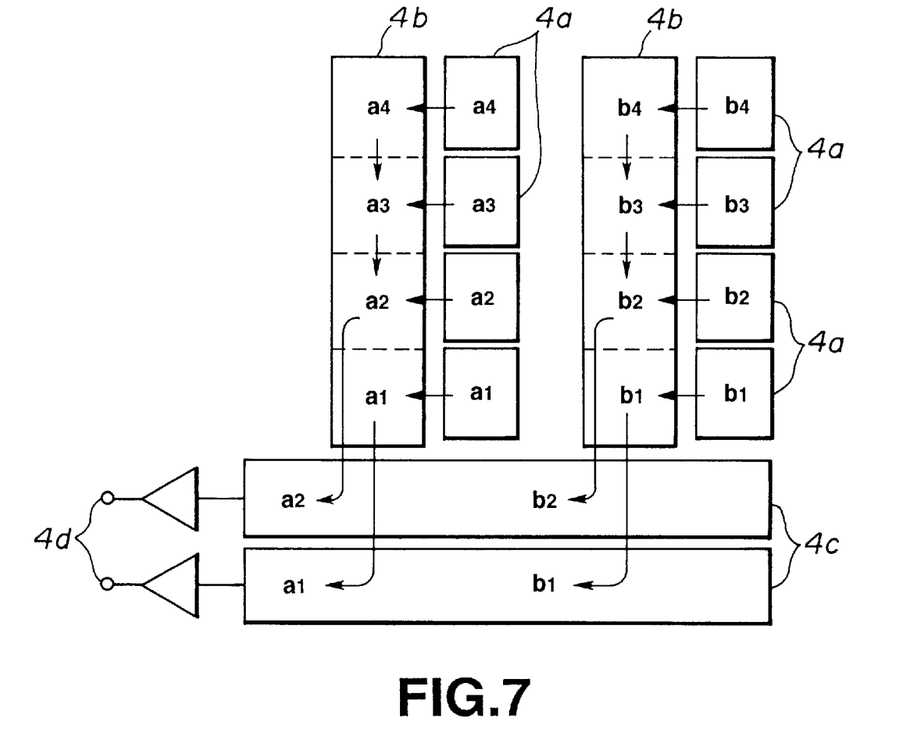
FIG. 7 is a block diagram showing an arrangement of a solid-state imaging device constituting the video camera device.
Figure 8:
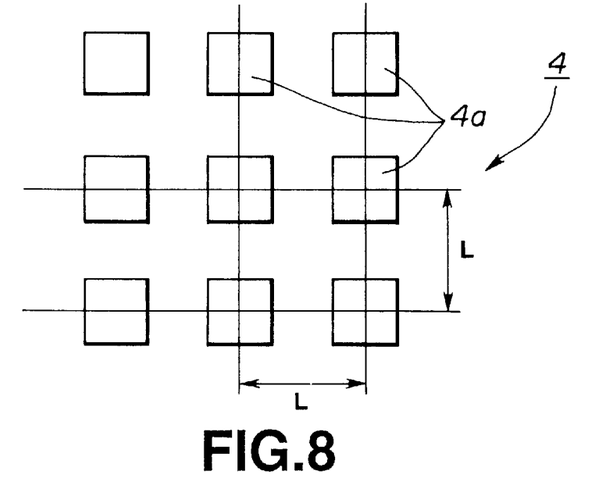
FIG. 8 illustrates an array of light receiving elements constituting the solid-state imaging element.

The CCD 4 is made up of light receiving elements 4a, arrayed in a lattice on the light receiving surface, a vertical transfer line 4b for reading put charges accumulated in the light receiving elements 4a and for transferring the read-out charges in the vertical direction, a horizontal transfer line 4c for transferring the charges transferred by the vertical transfer line 4b in the horizontal direction, and amplifiers 4d for converting the read-out charges into voltage, amplifying the resulting voltage and outputting the amplified voltage, as shown in FIG. 7. The light receiving elements 4a are arrayed in a square pattern, with each side of the square being of a length L, as shown in FIG. 8.

The operation of the present video camera device is now explained.

If an imaging light from an object falls on the optical system 1, the latter collects the imaging light and radiates it on the optical low-pass filter 2. The imaging light incident on the optical low-pass filter 2 has the spatial frequency suppressed by the optical low-pass filter 2 and has infrared light rays cut off by the infrared cut-off filter 3 before forming an image on the light receiving surface of the CCD 4. The CCD 4 reads out charges accumulated in the light receiving elements 4a at a pre-set time interval. The charges read out to the vertical transfer line 4b are transferred in the vertical direction and sequentially transferred to the horizontal line 4c so as to be transferred in the horizontal direction before being supplied via the amplifier 4d to the CDS circuit 5.

The CDS circuit 5 performs correlative differential sampling on an output voltage supplied from the amplifiers 4d, based on the read-out charges, and transmits the resulting sampled voltage to the A/D converter 6. The latter A/D converts the output of the CDS circuit 5 into and sends the resulting converted output to a video signal processing unit 7. The latter processes the output of the A/D converter 6 and outputs the resulting data as an imaging output. This outputs an imaging output corresponding to the imaging light from the object.

Figure 9:
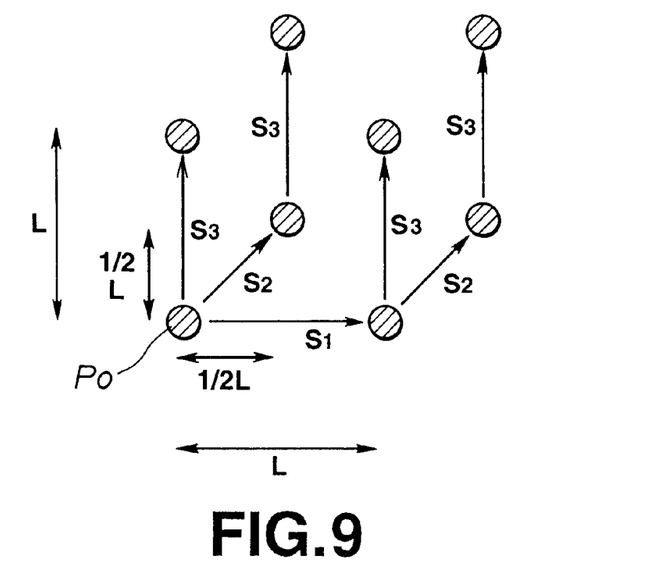
FIG. 9 is a schematic view illustrating spots of imaging light resolved by the optical low-pass filter.

If the imaging light, condensed as a light spot by the optical system 1, falls on a point P0 of the double refraction plate 2a of the optical low-pass filter 2 as shown in FIG. 9, the first double refraction plate 2a resolves the imaging light into an ordinary beam and an extraordinary beam along the horizontal arraying of the light receiving elements 4a of the CCD 4, as indicated by a reference S1 in FIG. 9, and shifts the extraordinary light beam a distance L in the horizontal direction.

If these two spots fall on the second double refraction plate 2b, the latter resolves the imaging light spots into an ordinary light beam and an extraordinary light beam in a 45° direction with respect to the horizontal arraying direction of the light receiving elements 4a, and shifts the extraordinary light a distance equal to one-half the square root with respect to the horizontal direction, as shown by a numeral S3 in FIG. 9.

If these four spots are incident on the third double refraction plate 2c, the third double refraction plate 2c resolves the imaging light into an ordinary light beam and an extraordinary light beam along the vertical arraying of the light receiving elements 4a and shifts the extraordinary beam a length L in the vertical direction.

Figure 10:
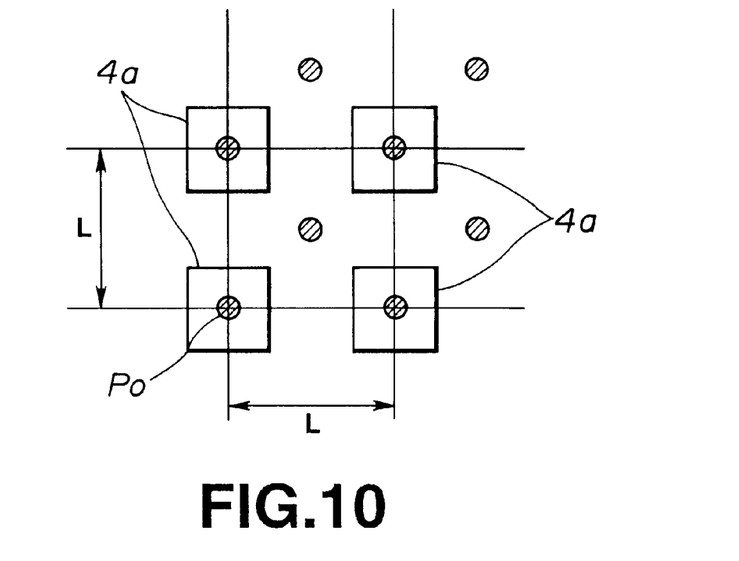
FIG. 10 is a schematic view showing an array of light receiving elements receiving the imaging light resolved by the low-pass filter.

This resolves each spot of the imaging light into eight light spots of equal intensities, as shown in FIG. 10. This figure is intended for illustrating the principle of the optical low-pass filter and hence gives an impression that the light intensities of the light received by the four light receiving elements are equal. The actual imaging light is not a sole spot but has a spatial frequency distribution so that the four light receiving elements receive the light rays with different intensities.

Figure 11A:
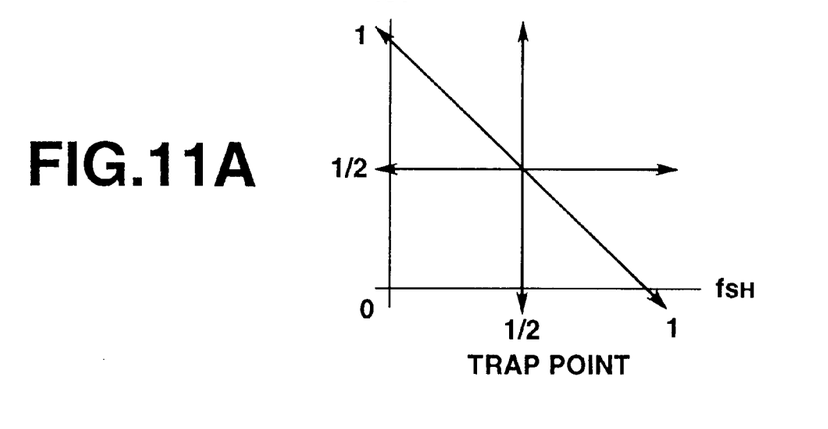
FIGS. 11A, 11B and 11C are graphs showing characteristics of the low-pass filter.
Figure 11B:
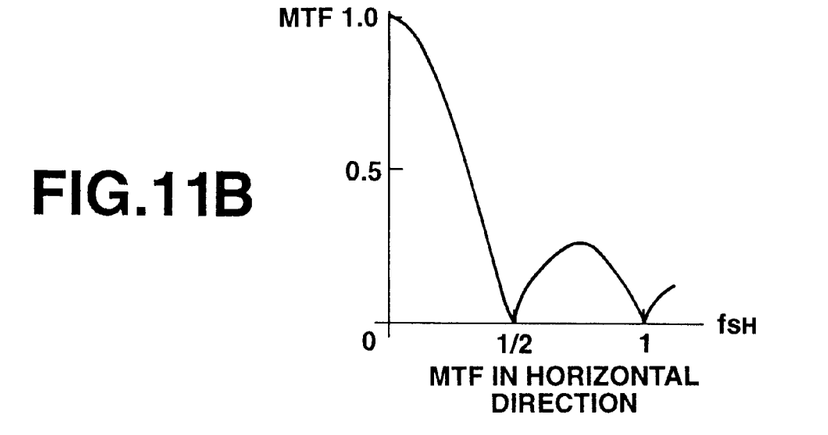
Figure 11C:
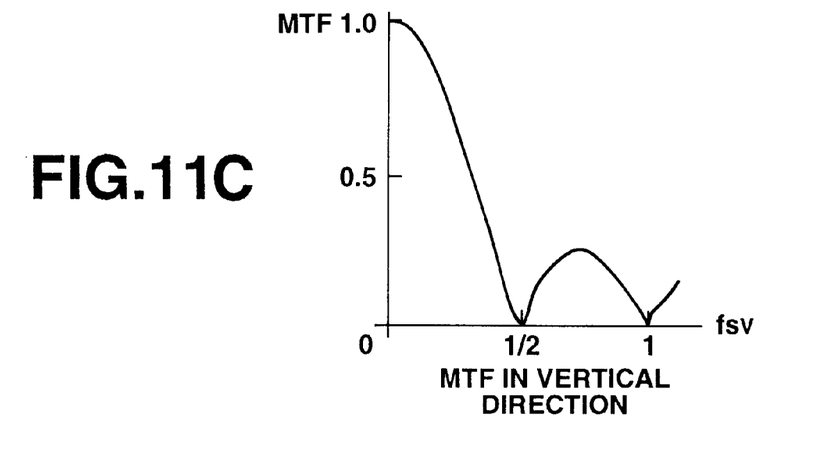

The optical low-pass filter 2, resolving a spot of the imaging light into eight spots as described above, performs spatial filtering having characteristics shown in FIGS. 11A, 11B and 11C on the imaging light received by the CCD 4.

The optical low-pass filter 2 has, in the spatial frequency spectrum, a trap line having a negative gradient, intersecting the frequency axis fSH at a frequency position fSH=1, fSV=0 and intersecting the frequency axis fSV at a frequency position (fSH=0, fSV=1, a trap line intersecting the frequency axis fSV at a frequency position fSH=0, fSV=1 and extending parallel to the frequency axis fSH, and a trap line intersecting the frequency axis fSV at a frequency position fSH=0, fSV=½ and extending parallel to the frequency axis fSH, as shown in FIG. 11A.

With such optical filter, there are two trap points on the horizontal MTF characteristic curve at fSH=½ and 1 where the MTF characteristics become equal to zero, as shown in FIG. 11B. In addition, there are two trap points on the horizontal MTF characteristic curve at fSV=½ and 1 where the vertical MTF characteristics become equal to zero, as shown in FIG. 11C.

By performing spatial filtering on the imaging light using the optical filter having such characteristics, the spatial frequency band of the imaging light may be suppressed to one half the spatial sampling frequencies fSH and fSV corresponding to the distance L of the light receiving sector 4a, so that it becomes possible to suppress the aliasing noise superimposed into an imaging output even if the imaging light is processed with spatial sampling. Thus it becomes possible with the present video camera device to reduce the aliasing noise superimposed on the imaging output.

Since the MTF characteristics in the horizontal direction can be coincided with those in the vertical direction, the frequency characteristics of the imaging output in the horizontal direction can be coincided with those in the vertical direction. In particular, the imaging output can be improved in frequency characteristics in case the light receiving elements are arranged in a square lattice configuration.

Figure 12A:
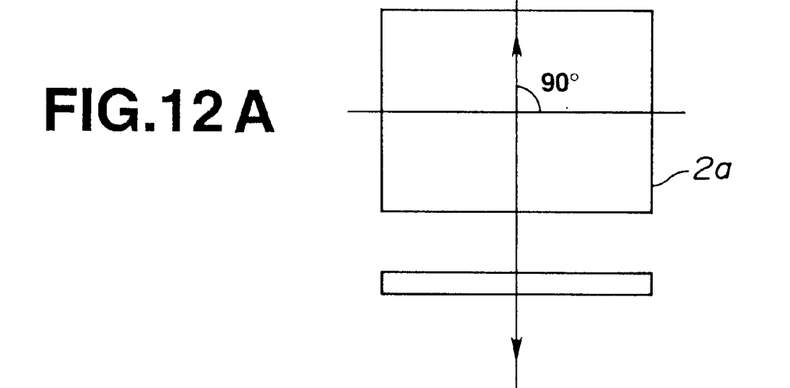
FIGS. 12A, 12B and 12C show another arrangement of the optical low-pass filter.
Figure 12B:
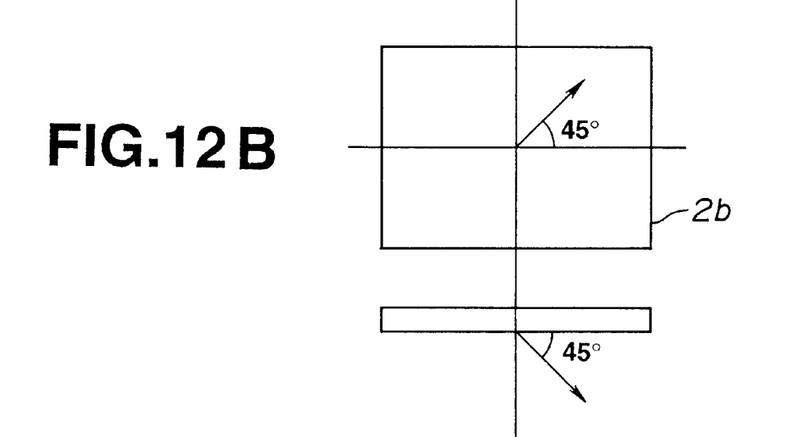
Figure 12C:
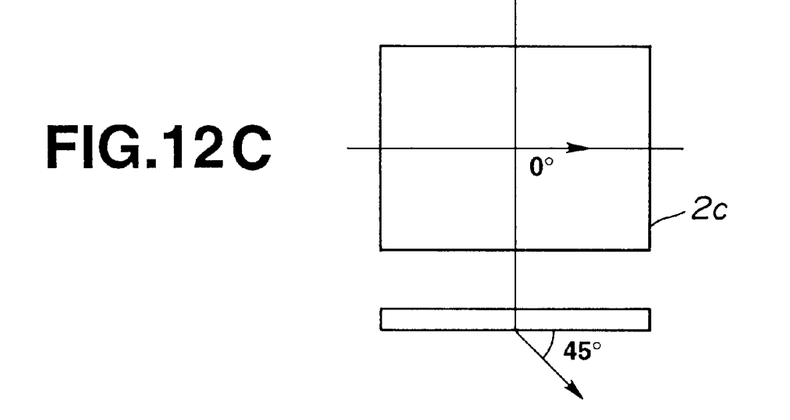

In the above description, the optical axes of the double refraction plates 2a to 2c making up the optical low-pass filter 2 are arrayed horizontally, at an angle of 45° and vertically with respect to the horizontal arraying of the light receiving elements 4a of the CCD 4, as shown in FIG. 7. However, these optical axes may also be arrayed vertically, at an angle of 45° and horizontally with respect to the horizontal arraying of the light receiving elements 4a of the CCD 4, as shown in FIGS. 12A to 12C.

Figure 13:
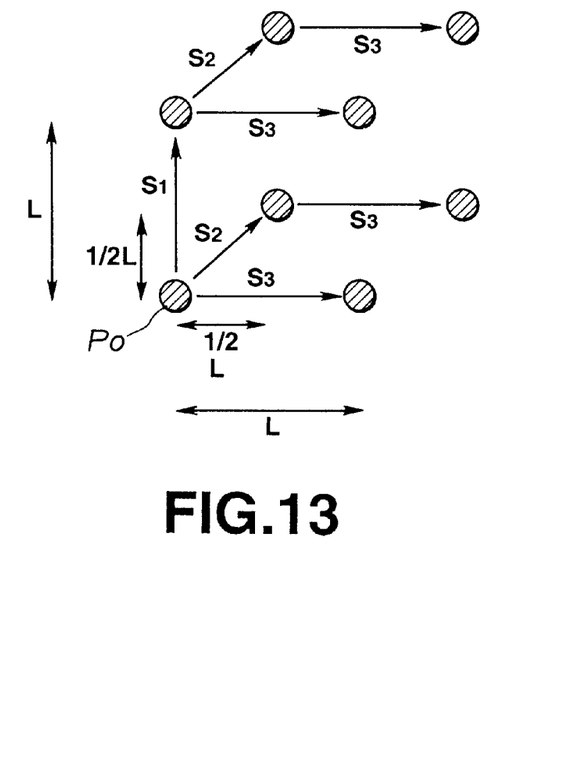
FIG. 13 is a schematic view showing an array of light receiving elements receiving the imaging light resolved by the optical low-pass filter.

In this case, the imaging light is resolved by the double refraction plates 2a to 2c in a different resolution sequence, as shown in FIG. 13. However, the eight spots can be formed at the positions similar to those of the optical low-pass filter shown in FIG. 7, so that the optical low-pass filter 2 may be provided having characteristics shown in FIGS. 11A to 11C.

Similarly, the optical low-pass filter 2 having characteristics shown in FIGS. 11A to 11C may be constituted by arraying the optical axes of the double refraction plates 2a to 2c at an angle of 45°, vertically and horizontally, or vertically, horizontally and at an angle of 45°.

Figure 14:
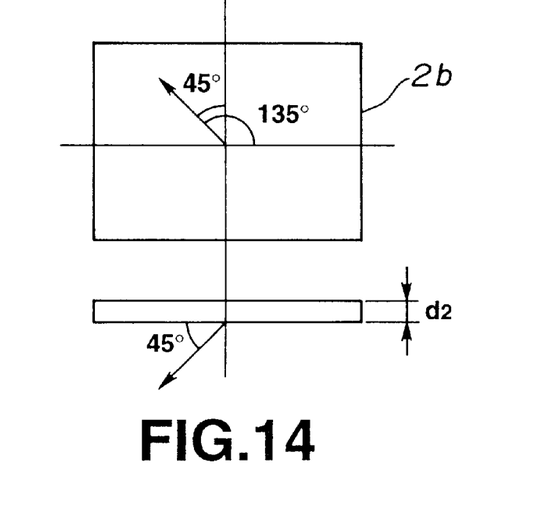
FIG. 14 illustrates an alternative arrangement of a second double refraction plate constituting the low-pass filter.
Figure 15:
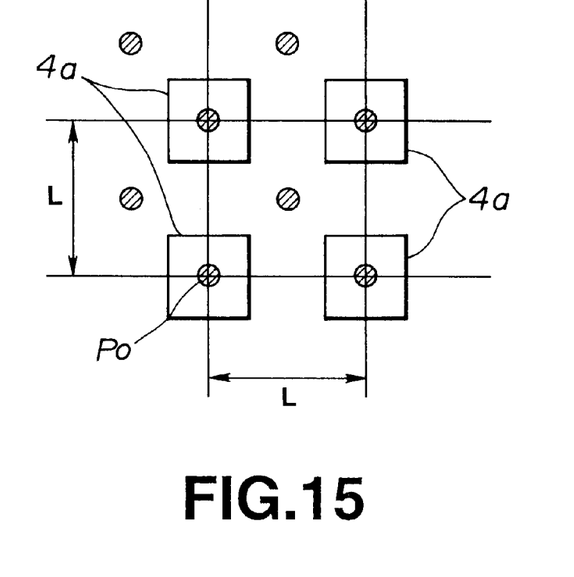
FIG. 15 is a schematic view showing an arrangement of a light receiving element receiving an imaging light beam resolved by an optical low-pass filter constructed using the second double refraction plate.

In the above description, the optical axis of the second double refraction plate 2b is arrayed at an angle of 45° relative to the horizonal array of the light receiving elements 2a of the double refraction plate 2b. This angle of 45°+n 90° where n=1, 2, 3 suffices. If this angle is set to 135°, as shown in FIG. 14, the array of the eight spots obtained on resolving the spot-like imaging light differs from that of FIG. 10, as shown in FIG. 15. However, the characteristics of the optical low-pass filter 2 having such an array of the light spots are the same as those shown in FIGS. 11A to 11C.

Figure 16:
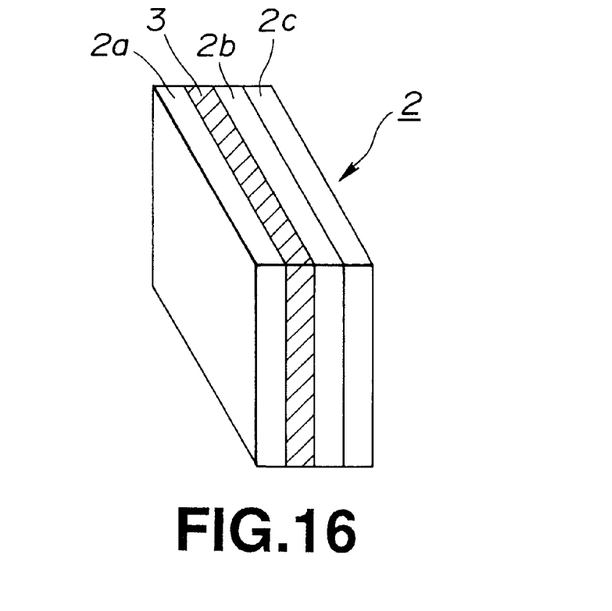
FIG. 16 illustrates still another arrangement of the optical low-pass filter.

Also, in the above description, the optical low-pass filter 2 and the infrared cut-off filter 3 are constructed separately from each other. It is however possible to array the infrared cut-off filter 3 directly at back of the first double refraction plate 2a and to construct the optical low-pass filter 2 and the infrared cut-off filter 3 as one with each other, as shown in FIG. 16. Since the optical low-pass filter 2 and the infrared cut-off filter 3 are formed as one with each other, it becomes possible to reduce the number of steps in assembling the device. In addition, a solid-state imaging device, used as a charge-coupled device (CCD) in the above embodiment, may be replaced by other solid-state imaging devices, having light receiving elements arrayed in a lattice configuration, such as a charge modulation device (CMD).

With the above-described video camera device of the present invention, since the band of the spatial frequency of the imaging light incident on the light receiving elements 4a of the CCD 4 can be suppressed to be lower than one-half the spatial sampling frequency determined by the arraying of the light receiving elements, it becomes possible to reduce the aliasing noise superimposed on an imaging output.

I claim:

1. An imager employing a solid-state imaging device comprising: a solid-state imaging device having light receiving elements arrayed in a square lattice configuration; and an optical low-pass filter for suppressing a band of a spatial frequency of an imaging light incident on the solid-state imaging device to not more than one-half of the spatial sampling frequency as determined by the array of the light receiving elements;

wherein said low-pass filter has zero-gain trap points at two points corresponding to the spatial sampling frequency of ½ and 1 on each of modulation transfer function characteristics in a horizontal direction and in a vertical direction and has a first double refraction plate for resolving the incident light into an ordinary beam and an extraordinary beam along the horizontal arraying direction of the light receiving elements; a second double refraction plate for resolving the incident light into an ordinary beam and an extraordinary beam along the horizontal arraying direction of 45°, 135°, 225° or 315° of the light receiving elements; and a third double refraction plate for resolving the incident light into an ordinary beam and an extraordinary beam along the vertical arraying direction of the light receiving elements; and wherein said first double refraction plate shifts only the ordinary light beam or the extraordinary light beam a distance equal to the lattice spacing of the square lattice; said second double refraction plate shifts only the ordinary beam or the extraordinary beam in a direction of 45°, 135°, 225° or 315° relative to the horizontal arraying direction of said light receiving elements a distance equal to one-half the square root of the lattice spacing; and wherein said third double refraction plate shifts only the ordinary beam or the extraordinary beam in the vertical arraying direction of the light receiving elements a distance equal to the lattice spacing.

2. An imager employing a solid-state imaging device comprising: a solid-state imaging device having light receiving elements arrayed in a square lattice configuration; and an optical low-pass filter for suppressing a band of a spatial frequency of an imaging light incident on the solid-state imaging device to not more than one-half of the spatial sampling frequency as determined by the array of the light receiving elements, wherein said low-pass filter is made up of three double refraction plates each having a refractive index of the ordinary beam of $n_o$, a refractive index of the extraordinary beam of $n_o$ and an angle between the optical axis and said three double refraction plates of 45°, said three double refraction plates being a first double refraction plate, a second double refraction plate and a third double refraction plate, said first double refraction plate having a thickness d and an optical axis horizontal or vertical relative to the horizontal direction of the light receiving elements in the plane of said first double refraction plate, said second double refraction plate having a thickness of $\sqrt{2}/2d$ and having an optical axis inclined 45° or 125° relative to the horizontal direction of the light receiving element in the horizontal plane of said second double refraction plate and said third double refraction plate having a thickness d and an optical axis 90° relative to the optical axis of the first double refraction plate in the plane of said third double refraction plate; and wherein, with the lattice spacing L of the light receiving elements arranged in the solid-state imaging device, the following relation:

$$L = d(n_e^2 * n_o^2 / n_e^2 + n_o^2)$$

is met.

\* \* \* \* \*